(12) United States Patent
Osawa

(10) Patent No.: US 6,942,933 B2
(45) Date of Patent: Sep. 13, 2005

(54) MAGNETIC RECORDING MEDIUM, PRODUCTION PROCESS THEREOF, AND MAGNETIC RECORDING AND REPRODUCING APPARATUS

(75) Inventor: Hiroshi Osawa, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 1 day.

(21) Appl. No.: 10/614,042

(22) Filed: Jul. 8, 2003

(65) Prior Publication Data

US 2004/0005481 A1 Jan. 8, 2004

Related U.S. Application Data

(60) Provisional application No. 60/394,931, filed on Jul. 11, 2002.

(30) Foreign Application Priority Data

Jul. 8, 2002 (JP) ...................................... P2002-198780

(51) Int. Cl.[7] .............................. G11B 5/66; G11B 5/70
(52) U.S. Cl. ................................ 428/694 TS; 427/131; 427/130

(58) Field of Search ........................... 428/694 TS, 611, 428/667, 900, 668; 427/130, 131

(56) References Cited

U.S. PATENT DOCUMENTS 6,759,149 B1 * 7/2004 Chen et al. .......... 428/694 TM
2003/0124389 A1 * 7/2003 Yoshida et al. ............. 428/695

* cited by examiner

*Primary Examiner*—Holly Rickman
(74) *Attorney, Agent, or Firm*—Sughrue Mion, PLLC

(57) ABSTRACT

A magnetic recording medium comprises a non-magnetic substrate, a non-magnetic undercoat layer, a magnetic layer, and a protective film, the layers and film being successively formed on the substrate. The non-magnetic undercoat layer has a multi-layer structure formed of at least two layers and contains a layer A formed of a material selected from a Cr—Ta based alloy, a Cr—Nb-based alloy, a Cr—Ti based alloy, a Cr—Zr-based alloy, and a Cr—Hf-based alloy, and a layer B formed of a material selected from a Co—W based alloy, a Co—W—B-based alloy, a Co—Mo based alloy, a Co—Mo—B based alloy, a Co—W—Mo based alloy, and a Co—W—Mo—B based alloy. The layers A and B are provided in this order from the non-magnetic substrate. A process for producing the medium comprises exposing the surface of the layer B to an oxygen atmosphere.

22 Claims, 1 Drawing Sheet

MAGNETIC RECORDING MEDIUM, PRODUCTION PROCESS THEREOF, AND MAGNETIC RECORDING AND REPRODUCING APPARATUS

CROSS-REFERENCE TO RELATED APPLICATIONS

This application claims benefit of Provisional Application 60/394,931 filed Jul. 11, 2002, incorporated herein by reference, under 35 U.S.C. § 111(b) pursuant to 35 U.S.C. § 119(e) (1).

BACKGROUND OF THE INVENTION

1. Field of the Invention

The present invention relates to a magnetic recording medium which is employed in, for example, hard disk devices, to a process for producing the magnetic recording medium, and to a magnetic recording and reproducing apparatus.

2. Background Art

The recording density of a hard disk device (HDD), which is a magnetic recording and reproducing apparatus, has increased at a rate of 60% per year, and this tendency is expected to continue. Therefore, magnetic recording heads and magnetic recording, media which are suitable for attaining high recording density are now under development.

Magnetic recording media employed in hard disk devices are required to have high recording density, and therefore demand has arisen for improvement of coercive force and reduction of medium noise.

Most magnetic recording media employed in hard disk devices have a structure including a magnetic recording medium substrate on which a metallic film is laminated through sputtering. Aluminum substrates and glass substrates are widely employed for producing magnetic recording media. An aluminum substrate is produced through the following process: an Ni—P-based alloy film (thickness: about 10 μm) is formed through electroless plating on an Al—Mg alloy substrate which has undergone mirror polishing, and the surface of the Ni—P-based alloy film is subjected to mirror polishing. Glass substrates are classified into two types; i.e., amorphous glass substrates and glass ceramic substrates. When either of these two types of glass substrate is employed to produce a magnetic recording medium, the substrate is subjected to mirror polishing.

In general, a magnetic recording medium employed to produce a hard disk device includes a non-magnetic substrate; a non-magnetic undercoat layer (formed of, for example, an Ni—Al-based alloy, Cr, or a Cr-based alloy); a non-magnetic intermediate layer (formed of, for example, a Co—Cr-based alloy or a Co—Cr—Ta-based alloy); a magnetic layer (formed of, for example, a Co—Cr—Pt—Ta-based alloy or a Co—Cr—Pt—B-based alloy); a protective film (formed of, for example, carbon), the layers and film being successively formed on the substrate; and a lubrication film containing a liquid lubricant formed on the protective film.

The Co—Cr—Pt—Ta-based alloy or the Co—Cr—Pt—B-based alloy employed in the magnetic layer contains Co as a primary component. Such a Co alloy has a hexagonal closest-packed (hcp) structure in which the C-axis is an easy-magnetization axis. Magnetic recording media are classified into a longitudinal recording type and a perpendicular recording type, in which the magnetic layer is generally formed of a Co alloy. In a longitudinal recording medium, the C-axis of a Co alloy is oriented horizontally with respect to the non-magnetic substrate, and in a perpendicular recording medium, the C-axis of a Co alloy is oriented perpendicular to the non-magnetic substrate. Therefore, in a longitudinal recording medium, desirably, crystals of a Co alloy are oriented along a (10•0) plane or a (11•0) plane.

As used herein, the symbol "•" of the crystal plane notation refers to the abbreviation of a Miller-Bravais index. In general, crystal planes of Co (hexagonal system) are represented by four indices (hkil). Of these indices, the index "i" is defined as follows: i=−(h+k). Therefore, the indices (hkil) can be abbreviated as (hk•l).

In a perpendicular recording medium, desirably, crystals of a Co alloy are oriented along a (00•1) plane. However, in a longitudinal recording medium, when crystals of a Co alloy are oriented along a (10•1) plane or a (00•1) plane; i.e., a crystal plane perpendicular to the substrate, reduction of magnetization in a longitudinal direction is induced, which is not preferable.

Since difficulty is encountered in directly orienting crystals of a Co alloy along a (10•0) plane or a (11•0) plane, in general, a Cr alloy having a cubic body-centered (bcc) structure is employed in an undercoat layer. The (11•0) plane of a Co alloy tends to be oriented along the (100) plane of a Cr alloy, and the (10•0) plane of a Co alloy tends to be oriented along the (112) plane of a Cr alloy.

When an aluminum substrate on which an Ni—P-based alloy film has been formed through electroless plating is heated, and then a Cr alloy film is formed on the substrate, crystals of the Cr alloy tend to be oriented along a (100) plane. When a Co alloy film is epitaxially grown on the Cr alloy film, crystals of the Co alloy are oriented along a (11•0) plane, and the resultant magnetic recording medium exhibits excellent properties.

Meanwhile, when a glass substrate is heated, and then a Cr alloy film is formed directly on the substrate, crystals of the Cr alloy tend to be oriented along a (110) plane. Therefore, when a Co alloy film is grown on the Cr alloy film, crystals of the Co alloy are oriented along a (10•1) plane, which is not preferable. When crystals of the Co alloy are oriented along a (10•1) plane, the C-axis (i.e., easy-magnetization axis) of the Co alloy has vector components in both the longitudinal and perpendicular directions, and thus the resultant magnetic recording medium is suitable as neither a longitudinal recording medium nor a perpendicular recording medium.

There have been proposed various techniques for orienting crystals of a Cr alloy film formed on a glass substrate along a (100) plane or a (112) plane.

In a technique proposed in European Patent Application EP 0704839 A1 employing an Al alloy having a B2 structure (e.g., an Al—Ni, Al—Co, or Al—Fe-based alloy) in an undercoat layer, crystal grains of a magnetic layer are confirmed to become small by the effect of an Al alloy such as an Al—Ni-based alloy or an Al—Co-based alloy, whereby noise is reduced. Among Al alloys having a B2 structure, an Al—Ni-based alloy is widely employed as a material for a non-magnetic undercoat layer. This is because the (112) plane of an Al—Ni-based alloy establishes excellent lattice matching with the (10•0) plane of a Co alloy in a magnetic layer, and therefore the (10•0) plane of the Co alloy is epitaxially grown on the (112) plane of the Al—Ni-based alloy. As a result, crystals of the magnetic layer formed of the Co alloy are oriented along the (10•0) plane, and thus high coercive force is obtained.

Japanese Patent No. 3217012 discloses a technique in which an undercoat layer predominantly containing Co is formed beneath a Cr alloy film, to thereby grow a Cr (100) plane and promote epitaxial growth of the (11•0) plane of a Co alloy.

In the technique proposed in European Patent Application EP 0704839 A1 employing an Al alloy having a B2 structure (e.g., an Al—Ni, Al—Co, or Al—Fe-based alloy) in an undercoat layer, crystals of an Al—Ni-based alloy may be insufficiently oriented along the (112) plane of the alloy, since the peak of the (112) plane is small. Therefore, as described in this publication, in order to orient crystals of the Al—Ni-based alloy along the (112) plane, the thickness of the Al—Ni-based alloy layer must be increased. However, when the thickness of the layer is increased, crystal grains of the Al—Ni-based alloy become large. When an Al—Ni-based alloy is employed in an undercoat layer, in order to attain high coercive force, the thickness of the layer must be increased. Meanwhile, in order to reduce the size of crystal grains so as to lower medium noise, the thickness of the layer must be decreased. Therefore, the aforementioned technique encounters difficulty in designing an optimal layer structure for a magnetic recording medium.

As described in Examples of Japanese Patent No. 3217012, when a Co alloy (e.g., Co-30at % Cr-10at % Zr, Co-36at % /cMn-10at % Ta, Co-30at % Cr-10at % SiO2, or Co-25at % Cr-12at % W) is employed in an undercoat layer, crystals of a Cr alloy are oriented along a (100) plane, and epitaxial growth of the (11•0) plane of the Co alloy is observed. However, the Cr alloy crystals arc insufficiently micronized, and a limitation is imposed on reduction of medium noise.

In association with an increase in recording density of magnetic recording and reproducing apparatuses, demand has arisen for reduction in the flying height of a magnetic head. In order to reduce the flying height of a magnetic head, the following two methods (the CSS method and the ramp load method) are generally employed.

In the CSS (contact start and stop) method, when a disk is stopped, the disk is in contact with a magnetic head, and when the disk is rotated, the head flies over the disk by means of pressure generated by airflow above the disk. In the CSS method, when appropriate irregularities (protrusions and depressions) are not present on the surface of the disk, adhesion between the head and the disk occurs. However, when the irregularities are formed on the entire surface of the disk, the flying head may hit the protrusions, and thus the flying height of the head may fail to be reduced. Therefore, in general, such irregularities are formed on a portion of the disk surface. The portion is called a "CSS zone," at which the head and the disk come in contact wish each other when the disk is stopped. Data are recorded in the remaining portion of the disk. In order to form irregularities merely on the CSS zone, typically, laser machining is employed. In the CSS method, generally, an aluminum substrate is employed, since such a substrate is readily subjected to laser machining.

In the ramp load method, when a disk is stopped, a magnetic head is moved to a ramp provided at the periphery of the disk. In the method, formation of irregularities on the surface of the disk is not required, and thus the flying height of the head can be reduced. In the ramp load method, generally, a glass substrate, on which irregularities are difficult to form through laser machining, is employed. The ramp load method is ideal in that formation of irregularities on the surface of the disk is not required, but the method involves a problem in that the head hits the disk when the head moves from the ramp to the surface of the disk.

Therefore, damage (e.g., film exfoliation) is likely to arise at the boundary between the ramp and the disk. In order to avoid such a problem, the ramp or the head must be designed appropriately, and the disk is required to employ a film exhibiting good adhesion to the glass substrate.

SUMMARY OF THE INVENTION

In view of the foregoing, an object of the present invention is to provide a magnetic recording medium which can attain higher recording density, which exhibits higher coercive force and lower noise, and which exhibits good adhesion to a glass substrate.

Another object of the present invention is to provide a process for producing the medium.

Still another object of the present invention is to provide a magnetic recording and reproducing apparatus containing the medium, In order to solve the aforementioned problems, the present inventors have performed extensive studies, and have found that properties of a magnetic recording and reproducing apparatus can be improved by employing a magnetic recording medium including a non-magnetic substrate; a non-magnetic undercoat layer containing Cr as a primary component and Ta, Nb, Ti, Zr, or Hf, the undercoat layer being formed on the substrate; and a layer containing Co as a primary component and W, B, or Mo, the Co-containing layer being formed on the undercoat layer. The present invention has been accomplished on the basis of this finding. Accordingly, the present invention provides the following.

(1) A magnetic recording medium comprising a non-magnetic substrate, a non-magnetic undercoat layer, a magnetic layer, and a protective film, the layers and film being successively formed on the substrate, wherein the non-magnetic undercoat layer has a multi-layer structure formed of at least two layers and contains a layer A formed of a material selected from the group consisting of a Cr—Ta-based alloy, a Cr—Nb-based alloy, a Cr—Ti-based alloy, a Cr—Zr-based alloy, and a Cr—Hf-based alloy (hereinafter the layer may be referred to as "layer A"), and a layer B formed of a material selected from the group consisting of a Co—W-based alloy, a Co—W—B-based alloy, a Co—Mo-based alloy, a Co—Mo—B-based alloy, a Co—W—Mo-based alloy, and a Co—W—Mo—B-based alloy (hereinafter the layer may be referred to as "layer B"), in which the layers A and B are provided in this order from the non-magnetic substrate.

(2) A magnetic recording medium according to (1), wherein the non-magnetic undercoat layer contains, on the side of the layer B that is close to the magnetic layer (hereinafter, the side may be referred to as the "magnetic-layer side"), a layer C which is a Cr layer or a Cr alloy layer formed of Cr and at least one element selected from among Ti, Mo, Al, Ta, W, Ni, B, Si, and V (hereinafter, the Cr layer or the Cr alloy layer may be referred to as "layer C").

(3) A magnetic recording medium according to (1) or (2), wherein the Cr—Ta-based alloy has a Ta content falling within a range of 25 at % to 50 at %.

(4) A magnetic recording medium according to (1) or (2), wherein the Cr—Nb-based alloy has an Nb content falling within a range of 25 at % to 50 at %.

(5) A magnetic recording medium according to (1) or (2), wherein the Cr—Ti-based alloy has a Ti content falling within a range of 25 at % to 50 at %.

(6) A magnetic recording medium according to (1) or (2), wherein the Cr—Zr-based alloy has a Zr content falling within a range of 25 at % to 50 at %.

(7) A magnetic recording medium according to (1) or (2), wherein the Cr—Hf-based alloy has an Hf content falling within a range of 25 at % to 50 at %.

(8) A magnetic recording medium according to (1) or (2), wherein the Co—W-based alloy has a W content falling within a range of 30 at % to 50 at %.

(9) A magnetic recording medium according to (1) or (2), wherein the Co—W—B-based alloy has a W content falling within a range of 30 at % to 50 at %, and a B content of 5 at % or less.

(10) A magnetic recording medium according to (1) or (2), wherein the Co—Mo-based alloy has an Mo content falling within a range of 30 at % to 50 at %.

(11) A magnetic recording medium according to (1) or (2), wherein the Co—Mo—B-based alloy has an Mo content falling within a range of 30 at % to 50 at %, and a B content of 5 at % or less.

(12) A magnetic recording medium according to (1) or (2), wherein, in the Co—W—Mo-based alloy, the total amount of W and Mo falls within a range of 30 at % to 50 at %.

(13) A magnetic recording medium according to (1) or (2), wherein, in the Co—W—Mo—B-based alloy, the total amount of W and Mo falls within a range of 30 at % to 50 at %, and the B content is 5 at % or less.

(14) A magnetic recording medium according to (1) or (2), wherein the non-magnetic substrate is formed of glass or silicon.

(15) A magnetic recording medium according to (1) or (2), wherein the magnetic layer is formed of at least one material selected from among a Co—Cr—Ta based alloy, a Co—Cr—Pt-based alloy, a Co—Cr—Pt—Ta-based alloy, a Co—Cr—Pt—B-based alloy, and a Co—Cr—Pt—B—Y-based alloy, wherein Y is Ta or Cu.

(16) A process for producing a magnetic recording medium as recited in (1) or (2), comprising a step of forming layer A, layer B, and layer C in this order, and a step of exposing the surface of the thus-formed layer B to an oxygen atmosphere.

(17) A process for producing a magnetic recording medium according to (16), wherein, in the step of exposing the surface of the layer B to an oxygen atmosphere, the pressure of an oxygen gas is regulated so as to fall within a range of $5 \times 10^{-4}$ Pa to $5 \times 10^{-2}$ Pa.

(18) A magnetic recording medium produced through a production process as recited in (16).

(19) A magnetic recording and reproducing apparatus comprising a magnetic recording medium as recited in (1) or (2), and a magnetic head for recording of data onto the medium and for reproduction of the data therefrom.

DETAILED DESCRIPTION OF THE INVENTION

The magnetic recording medium of the present invention includes a non-magnetic substrate, a non-magnetic undercoat layer, a magnetic layer, and a protective film, the layers and film being successively formed on the substrate. A characteristic feature of the magnetic recording medium resides in that the non-magnetic undercoat layer has a multi-layer structure formed of at least two layers and contains a layer formed of a material selected from the group consisting of a Cr—Ta-based alloy, a Cr—Nb-based alloy, a Cr—Ti-based alloy, a Cr—Zr-based alloy, and a Cr—Hf-based alloy (hereinafter the layer will be referred to as "layer A"), and a layer formed of a material selected from the group consisting of a Co—W-based alloy, a Co—W—B-based alloy, a Co—Mo-based alloy, a Co—Mo—B-based alloy, a Co—W—Mo-based alloy, and a Co—W—Mo—B-based alloy (hereinafter the layer will be referred to as "layer B"), in which the layers A and B are provided in this order from the non-magnetic substrate.

In the magnetic recording medium of the present invention, preferably, the non-magnetic undercoat layer has a multi-layer structure formed of at least three layers and contains, on the magnetic-layer side of the layer B, a Cr layer or a Cr alloy layer formed of Cr and at least one element selected from among Ti, Mo, Al, Ta, W, Ni, B, Si, and V (hereinafter, the Cr layer or the Cr alloy layer will be referred to as "layer C").

Figure 1:
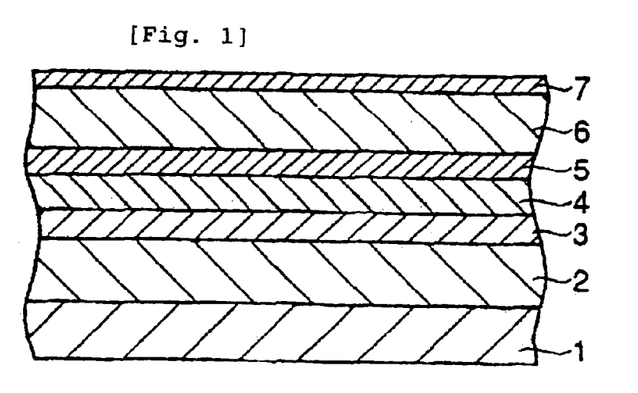
FIG. 1 schematically shows an embodiment of the magnetic recording medium of the present invention.

FIG. 1 schematically shows one embodiment of the magnetic recording medium of the present invention. For example, the magnetic recording medium of the present invention includes a non-magnetic substrate 1, non-magnetic undercoat layers 2 through 4, a magnetic layer 6, and a protective film 7, the layers and film being successively formed on the substrate. A characteristic feature of the magnetic recording medium resides in that the non-magnetic undercoat layer 2 is formed as layer A, and the non-magnetic undercoat layer 3 is formed as layer B on the layer 2.

In the magnetic recording medium of the present invention, preferably, the non-magnetic undercoat layer is formed of at least three layers; specifically, the non-magnetic undercoat layer 4 is formed as layer C on the non-magnetic undercoat layer 3 serving as the layer B. The layers A, B, and C are not necessarily in contact with one another, and intermediate layers may be provided between these layers.

In the present invention, preferably, a non-magnetic intermediate layer 5 is provided between the non-magnetic undercoat layer 4 and the magnetic layer 6, and a lubrication layer is provided on the protective film 7.

Examples of the non-magnetic substrate which may be employed in the present invention include substrates formed of a non-metallic material such as glass, ceramic, silicon, silicon carbide, carbon, or resin.

In association with an increase in recording density of a magnetic recording and reproducing apparatus, demand has arisen for reduction in the flying height of a magnetic head, and thus the non-magnetic substrate is required to have high surface evenness. Therefore, the non-magnetic substrate employed in the present invention preferably has an average surface roughness (Ra) of 2 nm (20 Å) or less, more preferably 1 nm or less.

From the viewpoints of cost and durability, the non-magnetic substrate employed in the present invention is preferably a glass substrate (i.e., a non-metallic substrate). Meanwhile, from the viewpoint of surface evenness, the non-magnetic substrate is preferably a glass substrate or a silicon substrate.

A glass substrate may be formed of glass ceramic or amorphous glass. Amorphous glass may be general-purpose glass such as soda-lime glass or aluminosilicate glass. Glass ceramic may be lithium-based glass ceramic. Glass ceramic containing $SiO_2$ and $Li_2O$ as constitutive components is preferred, from the viewpoints of thermal expansion coefficient matching between a substrate formed of the glass ceramic and other parts when the substrate is incorporated in a drive device, and rigidity of the substrate when the device is assembled and used in practice.

A ceramic substrate may be formed of a general-purpose sintered compact predominantly containing aluminum oxide, silicon nitride, or a similar material; or of fiber-reinforced material thereof A characteristic feature of the non-magnetic undercoat layer employed in the present invention resides in that the undercoat layer is produced as follows: a layer containing at least one species selected from the group consisting of a Cr—Ta-based alloy, a Cr—Nb-based alloy, a Cr—Ti-based alloy, a Cr—Zr-based alloy, and a Cr—Hf-based alloy is formed on the non-magnetic substrate, and subsequently a layer containing at least one species selected from the group consisting of a Co—W-based alloy, a Co—W—B-based alloy, a Co—Mo-based alloy, a Co—Mo—B-based alloy, a Co—W—Mo-based alloy, and a Co—W—Mo—B-based alloy is formed on the above-formed layer.

In the Cr—Ta-based alloy, the Ta content preferably falls within a range of 25 at % to 50 at %. The Cr—Ta alloy employed in the present invention has an amorphous structure. However, on the basis of the results of extensive studies, the present inventors have found that the necessary condition for attaining both high SNR (signal to noise ratio) and film adhesion is that the Cr—Ta alloy has a composition as represented by the binary phase diagram so that the C15 structure accounts for at least 75%.

In the Cr—Nb-based alloy, the Nb content preferably falls within a range of 25 at % to 50 at %. The reason for this is similar to that for the case of the Cr—Ta alloy.

In the Cr—Ti-based alloy, the Ti content preferably falls within a range of 25 at % to 50 at %. The reason for this is similar to that for the case of the Cr—Ta alloy.

In the Cr—Zr-based alloy, the Zr content preferably falls within a range of 25 at % to 50 at %. The reason for this is similar to that for the case of the Cr—Ta alloy.

In the Cr—Hf-based alloy, the Hf content preferably falls within a range of 25 at % to 50 at %. The reason for this is similar to that for the case of the Cr—Ta alloy.

In the Co—W-based alloy, the W content preferably falls within a range of 30 at % to 50 at %. When the W content is less than 30 at %, Co is magnetized, and the non-magnetic undercoat layer becomes a soft magnetic layer. As a result, spike noise is generated in recorded signals, to thereby lower SNR. In contrast, when the W content exceeds 50 at %, for example, crystal orientation of Cr or a Cr alloy in the layer C formed on the layer B is impaired, and coercive force (Hc) is lowered.

In the Co—W—B-based alloy, preferably, the W content falls within a range of 30 at % to 50 at %, and the B content is 5 at % or less. When the W content is less than 30 at %, Co is magnetized, and the non-magnetic undercoat layer becomes a soft magnetic layer. As a result, spike noise is generated in recorded signals, to thereby lower SNR. In contrast, when the W content exceeds 50 at %, for example, crystal orientation of a Cr alloy in the third non-magnetic undercoat layer (layer C) formed on the layer B is impaired, and coercive force (Hc) is lowered. In the case where the B content exceeds 5 at %, particularly when the non-magnetic undercoat layer is formed of three or more layers, crystal orientation of a Cr alloy in the layer C formed on the layer B is impaired, and coercive force (Hc) is lowered. The more than three layers refers to an embodiment where the third non-magnetic undercoat layer (layer C) is comprised of two or more layers, such as, for example, a Cr-20at % Ti layer and a Cr-20at % Mo layer.

In the Co—Mo-based alloy, the Mo content preferably falls within a range of 30 at % to 50 at %. When the Mo content is less than 30 at %, Co is magnetized, and the non-magnetic undercoat layer becomes a soft magnetic layer. As a result, spike noise is generated in recorded signals, to thereby lower SNR. In contrast, when the W content exceeds 50 at %, for example, crystal orientation of a Cr alloy in the third non-magnetic undercoat layer (layer C) formed on the layer B is impaired, and coercive force (Hc) is lowered.

In the Co—Mo—B-based alloy, preferably, the Mo content falls within a range of 30 at % to 50 at %, and the B content is 5 at % or less. When the Mo content is less than 30 at %, Co is magnetized, and the non-magnetic undercoat layer becomes a soft magnetic layer As a result, spike noise is generated in recorded signals, to thereby lower SNR. In contrast, when the Mo content exceeds 50 at %, for example, crystal orientation of a Cr alloy in the third non-magnetic undercoat layer (layer C) formed on the layer B is impaired, and coercive force (Hc) is lowered. In the case where the B content exceeds 5 at %, particularly when the non-magnetic undercoat layer is formed of three or more layers, crystal orientation of a Cr alloy in the layer C formed on the layer B is impaired, and coercive force (Hc) is lowered.

In the Co—W—Mo-based alloy, the total amount of W and Mo preferably falls within a range of 30 at % to 50 at %. Preferably, W and Mo are each present in an amount of at least 1 at %. Since W and Mo arc completely isomorphous and they form a solid solution, the Co—W—Mo-based alloy exhibits properties similar to those of the Co—W-based alloy or the Co—Mo-based alloy. Therefore, when the total amount of W and Mo is less than 30 at %, Co is magnetized, and the non-magnetic undercoat layer becomes a soft magnetic layer. As a result, spike noise is generated in recorded signals, to thereby lower SNR. In contrast, when the total amount of W and Mo exceeds 50 at %, for example, crystal orientation of a Cr alloy in the third non-magnetic undercoat layer (layer C) formed on the layer B is impaired, and coercive force (Hc) is lowered.

In the Co—W—Mo—B-based alloy, the total amount of W and Mo preferably falls within a range of 30 at % to 50 at %. Preferably, W and Mo are each present in an amount of at least 1 at %. Since W and Mo are completely isomorphous and they form a solid solution, the Co—W—Mo—B-based alloy exhibits properties similar to those of the Co—W—B-based alloy or the Co—Mo—B-based alloy. Therefore, when the total amount of W and Mo is less than 30 at %, Co is magnetized, and the non-magnetic undercoat layer becomes a soft magnetic layer. As a result, spike noise is generated in recorded signals, to thereby lower SNR. In contrast, when the total amount of W and Mo exceeds 50 at %, for example, crystal orientation of a Cr alloy in the third non-magnetic undercoat layer (layer C) formed on the layer B is impaired, and coercive force (Hc) is lowered. The B content is preferably 5 at % or less, as in the case of the Co—W—B-based alloy.

In the magnetic recording medium of the present invention, preferably, the non-magnetic undercoat layer is formed of a multi-layer structure including three or more layers. Preferably, the non-magnetic undercoat layer includes a layer containing at least one species selected from the group consisting of a Cr—Ta-based alloy, a Cr—Nb-based alloy, a Cr—Ti-based alloy, a Cr—Zr-based alloy, and a Cr—Hf-based alloy, the layer being provided on the non-magnetic substrate; a layer containing at least one species selected from the group consisting of a Co—W-based alloy, a Co—W—B-based alloy, a Co—Mo-based alloy, a Co—Mo—B-based alloy, a Co—W—Mo-based alloy, and a Co—W—Mo—B-based alloy, the Co-containing layer being provided on the Cr-containing layer; and a Cr layer or a Cr alloy layer containing Cr and one or more elements selected from among Ti, Mo, Al, Ta, W, Ni, B, Si, and V, the Cr layer or Cr alloy layer being provided on the Co-containing layer.

When the non-magnetic undercoat layer of the magnetic recording medium of the present invention is formed of three or more layers, from the viewpoint of improvement of SNR characteristics of the medium, the outermost layer (i.e., the third non-magnetic undercoat layer 4 shown in FIG. 1 (layer C)) is preferably formed of a layer of a Cr alloy containing Mo, W, V, or Ti (e.g., a Cr—Mo—, Cr—W—, Cr—V—, or Cr—Ti-based alloy) (such a Cr alloy has a lattice constant larger than that of Cr), so as to establish lattice matching between the Cr alloy and a Co alloy in the magnetic layer. The amount of Cr in the Cr alloy of the outermost layer is 50 at % or more.

Preferably, crystals of a Cr layer or a Cr alloy layer in the non-magnetic undercoat layer are predominantly oriented along a (100) plane. As a result, crystals of a Co alloy in the magnetic layer formed on the non-magnetic undercoat layer are strongly oriented along a (11•0) plane, leading to improvement of magnetic characteristics (e.g., coercive force (Hc)) and recording and reproduction characteristics (e.g., SNR).

The magnetic layer is preferably formed of a Co alloy which predominantly contains Co, which has an hop structure, and which establishes excellent lattice matching with, for example, a (100) plane in the non-magnetic undercoat layer provided directly below the magnetic layer. The magnetic layer preferably contains any one species selected from among) for example, a Co—Cr—Ta-based alloy, a Co—Cr—Pt-based alloy, a Co—Cr—Pt—Ta-based alloy, a Co—Cr—Pt—B-based alloy, a Co—Cr—Pt—B—Ta-based alloy, and a Co—Cr—Pt—B—Cu-based alloy.

When a Co—Cr—Ta-based alloy is employed, preferably, the Cr content falls within a range of 10 at % to 25 at %, and the Ta content falls within a range of 1 at % to 10 at %, from the viewpoint of improvement of SNR.

When a Co—Cr—Pt—Ta-based alloy is employed, preferably, the Cr content falls within a range of 10 at % to 25 at %, the Pt content falls within a range of 8 at % to 16 at %, and the Ta content falls within a range of 1 at % to 4 at %, from the viewpoint of improvement of SNR.

When a Co—Cr—Pt-based alloy is employed, preferably, the Cr content falls within a range of 10 at % to 25 at %, and the Pt content falls within a range of 8 at % to 16 at %, from the viewpoint of improvement of SNR.

When a Co—Cr—Pt—B-based alloy is employed, preferably, the Cr content falls within a range of 10 at % to 25 at %, the Pt content falls within a range of 8 at % to 16 at %, and the B content falls within a range of 1 at % to 20 at %, from the viewpoint of improvement of SNR.

When a Co—Cr—Pt—B—Ta-based alloy is employed, preferably, the Cr content falls within a range of 10 at % to 25 at %, the Pt content falls within a range of 8 at % to 16 at %, the B content falls within a range of 1 at % to 20 at %, and the Ta content falls within a range of 1 at % to 4 at %, from the viewpoint of improvement of SNR.

When a Co—Cr—Pt—B—Cu-based alloy is employed, preferably, the Cr content falls within a range of 10 at % to 25 at %, the Pt content falls within a range of 8 at % to 16 at %, the B content falls within a range of 2 at % to 20 at %, and the Cu content falls within a range of 1 at % to 4 at %, from the viewpoint of improvement of SNR.

So long as the thickness of the magnetic layer is at least 15 nm, no problem arises in terms of thermal stability. However, from the viewpoint of high recording density, the thickness of the magnetic layer is preferably 40 nm or less. This is because, when the thickness exceeds 40 nm crystal grains in the magnetic layer become large in size, and preferred recording and reproduction characteristics fail to be obtained. The magnetic layer may have a multi-layer structure, and a plurality of layers constituting the magnetic layer may be formed of combinations of the aforementioned materials. When the magnetic layer has a multi-layer structure, a layer of the magnetic layer that is provided directly atop the non-magnetic undercoat layer is preferably formed of a Co—Cr—Pt—B—Ta-based alloy, a Co—Cr—Pt—B—Cu-based alloy, or a Co—Cr—Pt—B-based alloy, from the viewpoint of improvement of SNR characteristics among recording and reproduction characteristics. The uppermost layer of the magnetic layer is preferably formed of a Co—Cr—Pt—B—Cu-based alloy or a Co—Cr—Pt—B-based alloy, from the viewpoint of improvement of SNR characteristics among recording and reproduction characteristics.

Preferably, a non-magnetic intermediate layer is provided between the non-magnetic undercoat layer and the magnetic layer for the purpose of promoting epitaxial growth of a Co alloy. Through provision of the intermediate layer, magnetic characteristics (e.g., coercive force) and recording and reproduction characteristics (e.g., SNR) are improved. The non-magnetic intermediate layer may contain Co and Cr. When the non-magnetic intermediate layer is formed of a Co—Cr-based alloy, the Cr content preferably falls within a range of 25 at % to 45 at %, from the viewpoint of improvement of SNR. When the non-magnetic intermediate layer is formed of a Co—Cr—Ru-based alloy, the total amount of the Cr and Ru preferably falls within a range of 25 at % to 45 at %, the Cr content preferably falls within a range of 5 at % to 30 at % and the Ru content preferably falls within a range of 5 at % to 30 at %, from the viewpoint of improvement of SNR. When the non-magnetic intermediate layer is formed of a Co—Cr—Ta-based alloy, the total amount of the Cr and Ta preferably falls within a range of 25 at % to 45 at %, the Cr content preferably falls within a range of 15 at % to 45 at % and the Ta content preferably falls within a range of 1 at % to 10 at %, from the viewpoint of improvement of SNR. The non-magnetic intermediate layer preferably has a thickness falling within a range of 0.5 nm to 3 nm, from the viewpoint of improvement of SNR.

The protective film may be formed of a conventionally known material; for example, a single-component material such as carbon or SiC, or a material predominantly containing such a component. The thickness of the protective film preferably falls within a range of 1 nm to 10 nm, from the viewpoint of spacing loss or durability when employed at high recording density.

If desired, a lubrication layer formed of a fluorine-based lubricant (e.g., perfluoropolyether) may be provided on the protective film.

The non-magnetic substrate may have texture lines formed on the surface thereof through texturing. Texturing is preferably carried out such that the average surface roughness of the substrate having texture lines preferably falls within a range of 0.1 nm to 0.7 nm, more preferably 0.1 nm to 0.5 nm, much more preferably 0.1 nm to 0.35 nm. Preferably, texture lines are formed so as to run along almost a circumferential direction of the substrate, from the viewpoint of enhancement of magnetic anisotropy of the magnetic recording medium in a circumferential direction thereof.

The texturing process may include oscillation. The term "oscillation" refers to a process in which a tape, such as a tape made of polyethylene or nylon, is caused to travel in a circumferential direction of the substrate while the tape is reciprocated in a radial direction of the substrate. Preferably, oscillation is performed at a rate of 60 times/minute to 1,200 times/minute, so that the surface of the substrate is uniformly abraded through texturing.

Examples of the texturing process which may be employed include a process in which texture lines having a line density of at least 7,500 lines/mm are formed, a mechanical texturing process employing the aforementioned tape, a process employing fixed abrasive grains, a process employing a fixed grinding stone, and a process employing laser abrasion.

Figure 2:
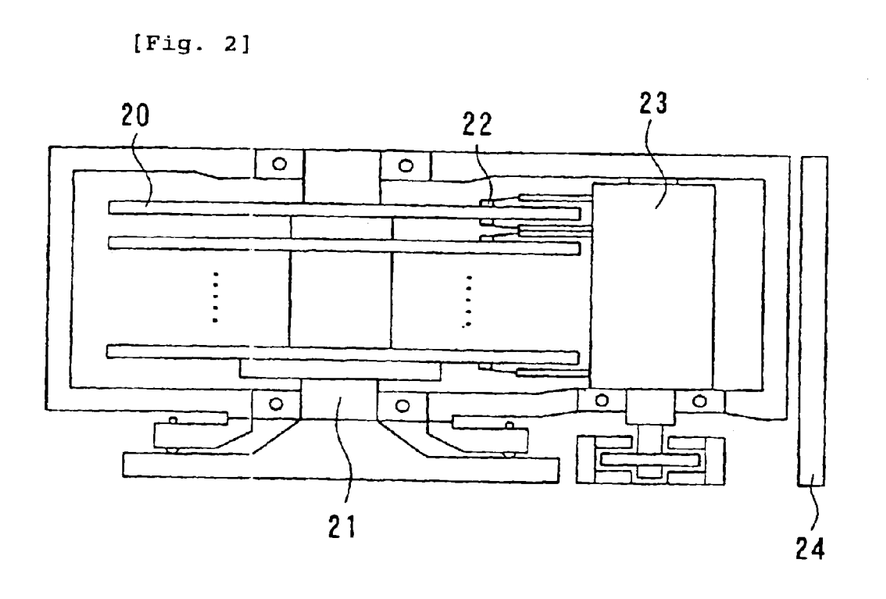
FIG. 2 shows an exemplary magnetic recording and reproducing apparatus incorporating the magnetic recording medium of the present invention.

FIG. 2 shows an embodiment of the magnetic recording and reproducing apparatus incorporating the aforementioned magnetic recording medium. The magnetic recording and reproducing apparatus shown in FIG. 2 includes a magnetic recording medium 20 having the structure shown in FIG. 1; a medium-driving section 21 which rotates the medium 20; a magnetic head 22 which is employed for recording of data onto the medium 20 and for reproduction of the data therefrom; a head-driving section 23 which drives the magnetic head 22 relative to the medium 20; and a recorded/reproduced-signal-processing system 24. In the recorded/reproduced-signal-processing system 24, input data are processed and recording signals are sent to the magnetic head 22, or reproduction signals from the head 22 are processed and the resultant data are output. The magnetic recording and reproducing apparatus of the present invention may employ, as the magnetic head 22, a head suitable for higher recording density containing a reproduction element such as an anisotropic magnetoresistance (AMR) element or a giant magnetoresistive (GMR) element.

The aforementioned magnetic recording and reproducing apparatus is suitable for attaining high recording density.

An embodiment of the production process of the present invention will next be described.

A non-magnetic substrate is formed of any non-metallic material selected from among glass, ceramic, silicon, silicon carbide, carbon, and resin, which are employed for producing a magnetic recording medium substrate.

The average surface roughness (Ra) of the non-magnetic substrate is preferably 2 nm (20 Å) or less, more preferably 1 nm or less.

The micro-waviness (Wa) of the surface of the non-magnetic substrate is preferably 0.3 nm or less, more preferably 0.25 nm or less. From the viewpoint of flying stability of a magnetic head, the average surface roughness (Ra) of at least one of an edge portion and a side portion of a chamfer section of the end surface of the substrate is preferably 10 nm or less, more preferably 9.5 nm or less. The chamfer section can have a width of 0.1 to 0.2 mm and an angle of 20 to 40 degrees. The micro-waviness (Wa) can be obtained as an average surface roughness as measured within a measurement range of 80 μm by use of, for example, a surface roughness measuring apparatus P-12 (product of KLA-Tencor, California, U.S.A.).

If desired, the surface of the nonmagnetic substrate is subjected to texturing. Subsequently, the non-magnetic substrate is washed, and the resultant substrate is placed in a chamber of a film formation apparatus. If desired, the substrate is heated to 100° C. to 400° C. by use of, for example, a heater. Above the non-magnetic substrate 1, a first non-magnetic undercoat layer 2, a second non-magnetic undercoat layer 3, a third non-magnetic undercoat layer 4, a non-magnetic intermediate layer 5, and a magnetic layer 6 are formed through DC or RF magnetron sputtering by use of sputtering targets containing materials having the same compositions as the respective layers.

Sputtering for forming the respective layers is carried out under, for example, the following conditions. The chamber employed for forming the layers is evacuated to $1 \times 10^{-4}$ Pa to $1 \times 10^{-7}$ Pa. The substrate is placed in the chamber, a sputtering gas (e.g., Ar gas) is brought into the chamber, and discharging is carried out, to thereby form the layers through sputtering. During the course of sputtering, power to be applied is regulated to 0.2 to 2.0 kW. When the discharging time and the power to be applied are regulated, the layers having desired thicknesses can be formed.

After formation of the second non-magnetic undercoat layer 3 (layer B) and before formation of the third non-magnetic undercoat layer 4 (layer C), preferably, a step of exposing the surface of the layer B to an oxygen atmosphere is carried out. The oxygen atmosphere to which the layer B is exposed preferably contains, for example, an oxygen gas of at least $5 \times 10^{-4}$ Pa. The exposure gas may be brought into contact with moisture. The exposure time is preferably 0.5 seconds to 15 seconds. In the exposure step, for example, the substrate on which the first non-magnetic undercoat layer and the second non-magnetic undercoat layer (layer B) have been formed may be removed from the chamber, followed by exposure of the layer B to air or an oxygen atmosphere. Alternatively, air or oxygen may be brought into the chamber to thereby expose the layer B thereto, without removal of the substrate from the chamber. The latter exposure process is preferred, since, when the layer B is exposed to an oxygen atmosphere in the chamber, an intricate step for removing the substrate from the vacuum chamber is not required, and the exposure step and the film formation step (including formation of the non-magnetic undercoat layer and the magnetic layer) can be successively performed in the chamber. In the case where the exposure step is performed in the chamber, when the chamber is evacuated to, for example, $1 \times 10^{-6}$ Pa or less, preferably, the layer B is exposed to an atmosphere containing an oxygen gas of at least $5 \times 10^{-4}$ Pa Although the layer B may be exposed to an oxygen gas at atmospheric pressure, the upper limit of the oxygen gas pressure is preferably $5 \times 10^{-2}$ Pa or less.

After formation of the non-magnetic undercoat layer, the magnetic layer (thickness: 15 nm to 40 nm) is formed through sputtering by use of a sputtering target containing a material of the magnetic layer. The sputtering target may contain, as a raw material, any one species selected from among a Co—Cr—Ta-based alloy, a Co—Cr—Pt-based alloy, a Co—Cr—Pt—Ta-based alloy, a Co—Cr—Pt—B-based alloy, a Co—Cr—Pt—B—Ta-based alloy, and a Co—Cr—Pt—B—Cu-based alloy. When a Co—Cr—Pt-based alloy is employed, preferably, the Cr content falls within a range of 10 at % to 25 at %, and the Pt content falls within a range of 8 at % to 16 at %. When a Co—Cr—Pt—B-based alloy is employed, preferably, the Cr content falls within a range of 10 at % to 25 at %, the Pt content falls within a range of 8 at % to 16 at %, and the B content falls within a range of 1 at % to 20 at %, from the viewpoint of improvement of SNR. When a Co—Cr—Pt—B—Ta-based alloy is employed, preferably, the Cr content falls within a range of 16 at % to 24 at %, the Pt content falls within a range of 8 at % to 16 at %, the B content falls within a range of 2 at % to 8 at %, and the Ta content falls within a range of 1 at % to 4 at %, When a Co—Cr—Pt—B—Cu-based alloy is employed, preferably, the Cr content falls within a range of 16 at % to 24 at %, the Pt content falls within a range of 8 at % to 16 at %, the B content falls within a range of 2 at % to 8 at %, and the Cu content falls within a range of 1 at % to 4 at %.

The non-magnetic undercoat layer is preferably formed such that crystals of Cr or a Cr alloy are predominantly oriented along a (100) plane.

When a non-magnetic intermediate layer is provided between the non-magnetic undercoat layer and the magnetic layer, preferably, the intermediate layer is formed by use of a sputtering target containing, as a raw material, a Co—Cr-based alloy (Cr content: 25 at % to 45 at %). When the magnetic layer contains B, preferably, the non-magnetic intermediate layer is formed under the sputtering conditions such that the Cr content of a region in the vicinity of the boundary between the non-magnetic undercoat layer and the magnetic layer, in which the B content is at least 1 at %, becomes 40 at % or less.

After formation of the magnetic layer, a protective film (e.g., a protective film predominantly containing carbon) is formed through a known technique, such as sputtering, plasma CVD, or a combination thereof.

If desired, a lubrication layer is formed on the protective film through application of a fluorine-based lubricant (e.g., perfluoropolyether) by means of, for example, dipping or spin coating.

EXAMPLES

Example 1

A glass substrate (outer diameter: 65 mm, inner diameter: 20 mm, thickness: 0.635 mm, surface roughness: 3 Å), serving as a non-magnetic substrate, was placed in a DC magnetron sputtering apparatus (Model: C3010, product of ANELVA, Tokyo, Japan). After the apparatus was evacuated to $2 \times 10^{-7}$ Torr ($2.7 \times 10^{-5}$ Pa), a first non-magnetic undercoat layer (layer A) (thickness: 200 Å) was formed at ambient temperature by use of a target containing a Cr—Ta-based alloy (Cr: 65 at %, Ta: 35 at %). Subsequently, a second non-magnetic undercoat layer (layer B) (thickness: 200 Å) was formed at ambient temperature by use of a target containing a Co—W—B-based alloy (Co: 57 at %, W: 40 at %, B: 3 at %).

Thereafter, the substrate was heated to 250° C., and then exposed to oxygen at 0.05 Pa for five seconds. Subsequently, a third non-magnetic undercoat layer (layer C) (thickness: 60 Å) was formed by use of a target containing a Cr—Ti alloy (Cr: 80 at %, Ti: 20 at %), A non-magnetic intermediate layer (thickness: 20 Å) was formed by use of a target containing a CoCr alloy (Co: 65 at %, Cr: 35 at %). A Co—Cr—Pt—B alloy layer (thickness: 200 Å) serving as a magnetic layer was formed by use of a target containing a Co—Cr—Pt—B alloy (Co: 60 at %, Cr: 22 at %, Pt: 12 at %, B: 6 at %), and a carbon protective film (thickness: 50 Å) was formed. During the course of formation of the layers and the film, the pressure of Ar was regulated to 3 mTorr. Through application of a lubricant containing perfluoropolyether by means of dipping, a lubrication layer (thickness: 20 Å) was formed.

Thereafter, the thus-produced magnetic recording media were subjected to a glide test at a glide height of 0.4 µinch by use of a glide tester, and recording and reproduction characteristics of the magnetic recording medium which had passed the glide test were evaluated by use of read/write analyzer RWA1632 (product of GUZIK, California, U.S.A.). In order to evaluate recording and reproduction characteristics, read-write conversion characteristics, including reproduction signal output (TAA), half power width of isolated read pulse (PW50), SNR, and overwrite (OW) were measured, Recording and reproduction characteristics were evaluated by use of a complex-type thin film magnetic recording head containing a giant magnetoresistive (GMR) element at the reproduction section. Recording of pattern signals was performed at 500 kFCI, and integration noise was measured at a frequency falling within a range of 1 MHz and a frequency corresponding to 500 kFCI. Reproduction output was measured at 250 kFCI, and SNR was calculated by use of the following equation: SNR=20× log(reproduction output/integration noise as measured at a frequency falling within a range of 1 MHz and a frequency corresponding to 500 kFCI). Coercive force (Hc) and squareness ratio (S*) were measured by use of a Kerr-effect-type magnetic characteristic measuring apparatus (model: RO1900, product of Hitachi Electronics Engineering Co., Ltd., Tokyo, Japan). The coercive force is represented in units of Oe (1 Oc=about 79 A/m).

For evaluation of film adhesion, a load/unload durability test was performed. In the load/unload durability test, load/unload operation is repeated for 400,000 times oil a drive having a disk and a head, and subsequently the head and the disk are observed under a microscope for confirmation of occurrence of damage.

Example 2

The procedure of Example 1 was repeated, except that a first non-magnetic undercoat layer (thickness: 200 Å) was formed by use of a target containing a Cr—Nb-based alloy (Cr: 65 at %, Nb: 35 at %) instead of the Cr—Ta-based alloy (Cr: 65 at %, Ta: 35 at %).

Example 3

The procedure of Example 1 was repeated, except that a first non-magnetic undercoat layer (thickness: 200 Å) was formed by use of a target containing a Cr—Ti-based alloy (Cr: 65 at %, Ti: 35 at %) instead of the Cr—Ta-based alloy (Cr: 65 at %, Ta: 35 at %).

Example 4

The procedure of Example 1 was repeated, except that a first non-magnetic undercoat layer (thickness: 200 Å) was formed by use of a target containing a Cr—Zr-based alloy (Cr: 65 at %, Zr: 35 at %) instead of the Cr—Ta-based alloy (Cr: 65 at %, Ta: 35 at %).

Example 5

The procedure of Example 1 was repeated, except that a first non-magnetic undercoat layer (thickness: 200 Å) was formed by use of a target containing a Cr—Hf-based alloy (Cr: 65 at %, Hf: 35 at %) instead of the Cr—Ta-based alloy (Cr: 65 at %, Ta: 35 at %).

Example 6

The procedure of Example 1 was repeated, except that a second non-magnetic undercoat layer (thickness: 200 Å) was formed by use of a target containing a Co—W-based alloy (Co: 60 at %, W: 40 at %) instead of the Co—W—B-based alloy (Co: 57 at %, W: 40 at %, B: 3 at %).

Example 7

The procedure of Example 1 was repeated, except that a second non-magnetic undercoat layer (thickness: 200 Å) was formed by use of a target containing a Co—Mo-based alloy (Co: 60 at %, Mo: 40 at %) instead of the Co—W—B-based alloy (Co: 57 at %, W: 40 at %, B: 3 at %).

Example 8

The procedure of Examnple 1 was repeated, except that a second non-magnetic undercoat layer (thickness: 200 Å) was formed by use of a target containing a Co—Mo—B-based alloy (Co: 57 at %, Mo: 40 at %, B: 3 at %) instead of the Co—W—B-based alloy (Co: 57 at %, W: 40 at %, B: 3 at %).

Example 9

The procedure of Example 1 was repeated, except that a second non-magnetic undercoat layer (thickness: 200 Å) was formed by use of a target containing a Co—W—Mo-based alloy (Co: 60 at %, W: 20 at %, Mo: 20 at %) instead of the Co—W—B-based alloy (Co: 57 at %, W: 40 at %, B: 3 at %).

Example 10

The procedure of Example 1 was repeated, except that a second non-magnetic undercoat layer (thickness: 200 Å) was formed by use of a target containing a Co—W—Mo—B-based alloy (Co: 57 at %, W: 20 at %, Mo: 20 at %, B: 3 at %) instead of the Co—W—B-based alloy (Co: 57 at %, W: 40 at %, B: 3 at %).

Comparative Example 1

A glass substrate (outer diameter: 65 mm, inner diameter: 20 mm, thickness: 0.635 mm, surface roughness: 3 Å), serving as a non-magnetic substrate, was placed in a DC magnetron sputtering apparatus (Model: C3010, product of ANELVA). After the apparatus was evacuated to $2 \times 10^{-7}$ Torr ($2.7 \times 10^{-5}$ Pa), a first non-magnetic undercoat layer (thickness: 200 Å) was formed at ambient temperature by use of a target containing a Co—W—B-based alloy (Co: 57 at %, W: 40 at %, B: 3 at %).

Thereafter, the substrate was heated to 250° C., and then exposed to oxygen at 0.05 Pa for five seconds. Subsequently, a second non-magnetic undercoat layer (thickness: 60 Å) was formed by use of a target containing a Cr—Ti alloy (Cr: 80 at %, Ti: 20 at %). A non-magnetic intermediate layer (thickness: 20 Å) was formed by use of a target containing a CoCr alloy (Co: 65 at %, Cr: 35 at %). A CoCrPtB alloy layer (thickness: 200 Å) serving as a magnetic layer was formed by use of a target containing a Co—Cr—Pt—B alloy (Co; 60 at %, Cr: 22 at %, Pt: 12 at %, B: 6 at %) and a carbon protective film (thickness: 50 Å) was formed. During the course of formation of the layers and the film, the pressure of Ar was regulated to 3 mTorr. Through application of a lubricant containing perfluoropolyether by imeans of dipping, a lubrication layer (thickness: 20 Å) was formed.

Comparative Example 2

The procedure of Comparative Example 1 was repeated, except that a first non-magnetic undercoat layer (thickness: 200 Å) was formed by use of a target containing a Co—W-based alloy (Co: 60 at %, W: 40 at %) instead of the Co—W—B-based alloy (Co: 57 at %, W: 40 at %, B: 3 at %).

Comparative Example 3

The procedure of Comparative Example 1 was repeated, except that a first non-magnetic undercoat layer (thickness: 200 Å) was formed by use of a target containing a Co—Mo-based alloy (Co: 60 at %, Mo: 40 at %) instead of the Co—W—B-based alloy (Co: 57 at %, W: 40 at %, B: 3 at %).

Comparative Example 4

The procedure of Comparativc Example 1 was repeated, except that a first non-magnetic undercoat layer (thickness: 200 Å) was formed by use of a target containing a Co—Mo—B-based alloy (Co: 57 at %, Mo: 40 at %, B: 3 at %) instead of the Co—W—B-based alloy (Co: 57 at %, W: 40 at %, B: 3 at %).

Comparative Example 5

The procedure of Comparative Example 1 was repeated, except that a first non-magnetic undercoat layer (thickness: 200 Å) was formed by use of a target containing a Co—W—Mo-based alloy (Co: 60 at %, W: 20 at %, Mo: 20 at %) instead of the Co—W—B-based alloy (Co: 57 at %, W: 40 at %, B: 3 at %).

Comparative Example 6

The procedure of Comparative Example 1 was repeated, except that a first non-magnetic undercoat layer (thickness: 200 Å) was formed by use of a target containing a Co—W—Mo—B-based alloy (Co: 57 at %, W: 20 at %, Mo: 20 at %, B: 3 at %) instead of the Co—W—B-based alloy (Co: 57 at %, W: 40 at %, B: 3 at %).

Table 1 shows the results of evaluations of recording and reproduction characteristics, coercive force (Hc), and squareness ratio of the magnetic recording media of Examples 1 through 10 and Comparative Examples 1 through 6. Table 2 shows the results of the load/unload durability test. As shown in Table 1, each of the magnetic recording media of Comparative Examples in which the first non-magnetic undercoat layer is formed of a Co—W—B-based alloy, a Co—Mo—B-based alloy, or a Co—W—Mo—B-based alloy exhibits good SNR, but, as shown in the results of the load/unload durability test (Table 2), either or both of the head and the disk is damaged. In contrast, each of the magnetic recording media of Examples 1, 8, and 10, in which the first non-magnetic undercoat layer is formed of a Cr—Ta-based alloy, exhibits SNR comparable to those of the above magnetic recording media and exhibits enhanced film adhesion, and therefore, as shown in the results of the load/unload durability test, neither the head nor the disk is damaged.

Each of the magnetic recording media of Examples 2 through 5, in which the first non-magnetic undercoat layer is formed of a Cr—Nb-based alloy, a Cr—Ti-based alloy, a Cr—Zr-based alloy, or a Cr—Hf-based alloy instead of a Cr—Ta-based alloy, exhibits good SNR and results of the load/unload durability test, which are comparable to those of the magnetic recording medium of Example 1.

Each of the magnetic recording media of Examples 6, 7, and 9, in which the second non-magnetic undercoat layer is formed of a Co—W-based alloy, a Co—Mo-based alloy, or a Co—W—Mo-based alloy instead of a Co—W—B-based alloy, exhibits good SNR and results of the load/unload durability test, which are comparable to those of the magnetic recording medium of Example 1. As shown in the results of Comparative Example 2, 3, or 5, when a Co—W- based alloy layer, a Co—Mo-based alloy layer, or a Co—W—Mo-based alloy layer is formed directly on the substrate, the resultant magnetic recording medium exhibits an SNR lower by about 1.5 dB than that of the magnetic recording medium of Example 1. However, when such a Co alloy layer is formed on a Cr—Ta-based alloy layer which has been formed on the substrate, the resultant magnetic recording medium exhibits an SNR comparable to that of the magnetic recording medium of Example 1.

TABLE 1

|  | Coercive force (Oe) | Squareness ratio | TAA (μV) | OW (dB) | PW50 (ns) | SNR (dB) |
|---|---|---|---|---|---|---|
| Ex. 1 | 4.341 | 0.74 | 1.132 | 38.2 | 9.33 | 18.1 |
| Ex. 2 | 4.289 | 0.74 | 1.221 | 39.1 | 9.34 | 18.2 |
| Ex. 3 | 4.353 | 0.74 | 1.234 | 38.6 | 9.36 | 18.0 |
| Ex. 4 | 4.361 | 0.74 | 1.257 | 38.4 | 9.31 | 18.2 |
| Ex. 5 | 4.297 | 0.73 | 1.224 | 39.3 | 9.37 | 18.3 |
| Ex. 6 | 4.412 | 0.74 | 1.212 | 38.0 | 9.29 | 17.9 |
| Ex. 7 | 4.290 | 0.73 | 1.215 | 38.9 | 9.35 | 17.8 |
| Ex. 8 | 4.288 | 0.73 | 1.228 | 38.5 | 9.36 | 18.1 |
| Ex. 9 | 4.325 | 0.74 | 1.242 | 38.5 | 9.34 | 18.0 |
| Ex. 10 | 4.278 | 0.73 | 1.209 | 39.4 | 9.41 | 18.3 |
| Comp. Ex. 1 | 4.327 | 0.74 | 1.211 | 38.7 | 9.41 | 18.1 |
| Comp. Ex. 2 | 4.256 | 0.73 | 1.213 | 39.1 | 9.36 | 16.5 |
| Comp. Ex. 3 | 4.321 | 0.74 | 1.222 | 38.6 | 9.42 | 16.6 |
| Comp. Ex. 4 | 4.245 | 0.73 | 1.243 | 39.8 | 9.41 | 17.9 |
| Comp. Ex. 5 | 4.213 | 0.73 | 1.232 | 39.9 | 9.36 | 16.7 |
| Comp. Ex. 6 | 4.259 | 0.73 | 1.243 | 38.9 | 9.36 | 17.8 |

TABLE 2

|  | Damage to disk | Damage to head |
|---|---|---|
| Example 1 | No | No |
| Example 2 | No | No |
| Example 3 | No | No |
| Example 4 | No | No |
| Example 5 | No | No |
| Example 6 | No | No |
| Example 7 | No | No |
| Example 8 | No | No |
| Example 9 | No | No |
| Example 10 | No | No |
| Comparative Example 1 | Yes | No |
| Comparative Example 2 | Yes | Yes |
| Comparative Example 3 | Yes | Yes |
| Comparative Example 4 | No | Yes |
| Comparative Example 5 | No | Yes |
| Comparative Example 6 | Yes | No |

The magnetic recording medium of the present invention includes a non-magnetic substrate, a non-magnetic undercoat layer, a magnetic layer, and a protective film. A characteristic feature of the magnetic recording medium resides in that the non-magnetic undercoat layer includes a layer predominantly containing Cr and containing at least one species selected from the group consisting of a Cr—Ta-based alloy, a Cr—Nb-based alloy, a Cr—Ti-based alloy, a Cr—Zr-based alloy, and a Cr—Hf-based alloy, the layer being formed on the non-magnetic substrate; and a layer predominantly containing Co and containing at least one species selected from the group consisting of a Co—W-based alloy, a Co—W—B-based alloy, a Co—Mo-based alloy, a Co—Mo—B-based alloy, a Co—W—Mo-based alloy, and a Co—W—Mo—B-based alloy, the Co-containing layer being formed on the Cr-containing layer. Therefore, the magnetic recording medium exhibits enhanced SNR and is suitable for high-density recording.

While the invention has been described in detail and with reference to specific embodiments thereof, it will be apparent to one skilled in the art that various changes and modifications can be made therein without departing from the spirit and scope thereof This application is based on Japanese Patent Application No. P2002-198780 filed Jul. 8, 2002, incorporated herein by reference in its entirety.

What is claimed is:

1. A magnetic recording medium comprising a non-magnetic substrate, a non-magnetic undercoat layer, a magnetic layer, and a protective film, the layers and film being successively formed on the substrate, wherein the non-magnetic undercoat layer has a multi-layer structure formed of at least two layers and contains a layer A formed of a material selected from the group consisting of a Cr—Ta[[-based]] alloy, a Cr—Nb[[-based]] alloy, a Cr—Ti[[-based]] alloy, a Cr—Zr[[-based]] alloy, and a Cr—Hf[[-based]] alloy, and a layer B formed of a material selected from the group consisting of a Co—W[[-based]] alloy, a Co—W—B[[-based]] alloy, a Co—Mo[[-based]] alloy, a Co—Mo—B[[-based]] alloy, a Co—W—Mo[[-based]] alloy, and a Co—W—Mo—B[[-based]] alloy, in which the layers A and B are provided in this order from the non-magnetic substrate.

2. A magnetic recording medium according to claim 1, wherein the non-magnetic undercoat layer contains, on the side of the layer B that is close to the magnetic layer, a layer C which is a Cr layer or a Cr alloy layer formed of Cr and at least one element selected from among Ti, Mo, Al, Ta, W, Ni, B, Si, and V.

3. A magnetic recording medium according to claim 1 or 2, wherein layer A contains the Cr—Ta alloy and the Cr—Ta[[-based]] alloy has a Ta content falling within a range of 25 at % to 50 at %.

4. A magnetic recording medium according to claim 1 or 2, wherein layer A contains the Cr—Nb alloy and the Cr—Nb[[-based]] alloy has an Nb content falling within a range of 25 at % to 50 at %.

5. A magnetic recording medium according to claim 1 or 2, wherein layer A contains the Cr—Ti alloy and the Cr—Ti[[-based]] alloy has a Ti content falling within a range of25 at % to50 at %.

6. A magnetic recording medium according to claim 1 or 2, wherein layer A contains the Cr—Zr alloy and the Cr—Zr[[-based]] alloy has a Zr content falling within a range of 25 at % to 50 at %.

7. A magnetic recording medium according to claim 1 or 2, wherein layer A contains the Cr—Hf alloy and the Cr—Hf[[-based]] alloy has an Hf content falling within a range of 25 at % to 50 at %.

8. A magnetic recording medium according to claim 1 or 2, wherein layer B Contains the Co—W alloy and the Co—W[[-based]] alloy has a W content falling within a range of 30 at % to 50 at %.

9. A magnetic recording medium according to claim 1 or 2, wherein layer B contains the Co—W—B alloy and the Co—W—B[[-based]] alloy has a W content falling within a range of 30 at % to 50 at %, and a B content of 5 at % or less.

10. A magnetic recording medium according to claim 1 or 2, wherein layer B contains the Co—Mo alloy and the Co—Mo[[-based]] alloy has an Mo content falling within a range of 30 at % to 50 at %.

11. A magnetic recording medium according to claim 1 or 2, wherein layer B contains the Co—Mo—B alloy and the Co—Mo—B[[-based]] alloy has an Mo content falling within a range of 30 at % to 50 at %, and a B content of 5 at % or less.

12. A magnetic recording medium according to claim 1 or 2, wherein, layer B contains the Co—W—Mo alloy and in the Co—W—Mo[[-based]] alloy, the total amount of W and Mo falls within a range of 30 at % to 50 at %.

13. A magnetic recording medium according to claim 1 or 2, wherein, layer B contains the Co—W—Mo alloy and in the Co—W—Mo—B[[-based]] alloy, the total amount of W and Mo falls within a range of 30 at % to 50 at %, and the B content is 5 at % or less.

14. A magnetic recording medium according to claim 1 or 2, wherein the non-magnetic substrate is formed of glass or silicon.

15. A magnetic recording medium according to claim 1 or 2, wherein the magnetic layer is formed of at least one material selected from among a Co—Cr—Ta alloy, Co—Cr—Pt[[-based]] alloy, a Co—Cr—Pt—Ta[[-based]] alloy, a Co—Cr—Pt—B[[-based]] alloy, and a Co—Cr—Pt—B—Y[[-based]] alloy, wherein Y is Ta or Cu.

16. A process for producing a magnetic recording medium as recited in claim 2, comprising a step of forming layer A, layer B, and layer C in this order, and a step of exposing the surface of the thus-formed layer B to an oxygen atmosphere.

17. A process for producing a magnetic recording medium according to claim 16, wherein, in the step of exposing the surface of the layer B to an oxygen atmosphere, the pressure of an oxygen gas is regulated so as to fall within a range of $5\times10^{-4}$ Pa to $5\times10^{-2}$ Pa.

18. A magnetic recording medium produced through a production process as recited in claim 16.

19. A magnetic recording and reproducing apparatus comprising a magnetic recording medium as recited in claim 1 or 2, and a magnetic head for recording of data onto the medium and for reproduction of the data therefrom.

20. A process for producing a magnetic recording medium as recited in claim 1, comprising a step of forming layer A and layer B in this order, and a step of exposing the surface of the thus-formed layer B to an oxygen atmosphere.

21. A process for producing a magnetic recording medium according to claim 20, wherein, in the step of exposing the surface of the layer B to an oxygen atmosphere, the pressure of an oxygen gas is regulated so as to fall within a range of $5\times10^{-4}$ Pa to $5\times10^{-2}$ Pa.

22. A magnetic recording medium produced through a production process as recited in claim 20.

* * * * *